(12) United States Patent
Van Goolen et al.

(10) Patent No.: US 8,671,650 B2
(45) Date of Patent: Mar. 18, 2014

(54) TRANSFER LINE

(75) Inventors: Gunther Victor Maria Emiel Van Goolen, Riijksweg (BE); Stefaan Jaak Vanquickenborne, Riijksweg (BE); Nigel Harrison, Sandwich (GB)

(73) Assignee: Capsugel Belgium NV, Bornem (BE)

( * ) Notice: Subject to any disclaimer, the term of this patent is extended or adjusted under 35 U.S.C. 154(b) by 719 days.

(21) Appl. No.: 12/446,593

(22) PCT Filed: Oct. 17, 2007

(86) PCT No.: PCT/IB2007/003157
§ 371 (c)(1),
(2), (4) Date: Oct. 1, 2010

(87) PCT Pub. No.: WO2008/050208
PCT Pub. Date: May 2, 2008

(65) Prior Publication Data
US 2011/0005167 A1    Jan. 13, 2011

Related U.S. Application Data

(60) Provisional application No. 60/862,643, filed on Oct. 24, 2006.

(51) Int. Cl.
*B65B 5/08* (2006.01)
(52) U.S. Cl.
USPC .................................. 53/281; 53/313; 53/534
(58) Field of Classification Search
USPC ............. 198/385, 797; 53/281, 313, 384, 534
See application file for complete search history.

(56) References Cited

U.S. PATENT DOCUMENTS 2,732,987 A * 1/1956 Moore ............................ 134/62
3,084,781 A    4/1963 Merrill ............................ 198/33
(Continued)

FOREIGN PATENT DOCUMENTS

DE    3800852        7/1989
EP    0 116 743 A1   8/1984
(Continued)

OTHER PUBLICATIONS

International Search Report of PCT/IB2007/003157, mailed on Feb. 26, 2008, 3 pages.
(Continued)

*Primary Examiner* — Hemant M Desai
*Assistant Examiner* — Gloria R Weeks
(74) *Attorney, Agent, or Firm* — Finnegan, Henderson, Farabow, Garrett & Dunner, LLP (57) ABSTRACT

The present invention relates to a transfer line for the transfer of identical filled two-piece capsules between two successive processing stations comprising a and on unloading area, a plurality of identical transfer units each comprising a plurality of cavities each adapted to receive a capsule at the loading area and to let such capsule being unloaded at the unloading area, said plurality of cavities of each transfer unit being designed so as to receive in a first relative configuration the groups of filled two-piece capsules when located at a loading position in the loading area and so as to discharge these groups when located at an unloading position in the unloading area, a conveyor device adapted to temporarily and individually support the transfer units so as to transfer them from the loading position to the unloading position and vice-versa, while keeping them substantially in a same orientation in the loading and unloading positions, and at least from the loading position to the unloading position.

15 Claims, 3 Drawing Sheets

(56) References Cited

U.S. PATENT DOCUMENTS

| | | | |
|---|---|---|---|
| 4,185,734 A | 1/1980 | Bross | 198/484 |
| 4,204,951 A | 5/1980 | Moser et al. | |
| 4,369,702 A * | 1/1983 | Ackley | 101/40 |
| 4,413,556 A * | 11/1983 | Ackley | 101/40 |
| 4,584,817 A | 4/1986 | Yamamoto et al. | |
| 4,609,417 A | 9/1986 | Smith | |
| 4,632,028 A * | 12/1986 | Ackley | 101/40 |
| 4,657,130 A * | 4/1987 | Ackley et al. | 198/397.04 |
| 4,677,812 A | 7/1987 | Tayebi | |
| 4,722,433 A * | 2/1988 | Gough | 198/706 |
| 4,724,019 A | 2/1988 | Brown et al. | |
| 4,734,149 A | 3/1988 | Brown | |
| 4,940,499 A * | 7/1990 | Lebrun et al. | 156/69 |
| 4,959,943 A * | 10/1990 | Yamamoto et al. | 53/282 |
| 5,012,916 A * | 5/1991 | Cruver | 198/419.3 |
| 5,054,258 A | 10/1991 | Tait et al. | |
| 5,238,124 A | 8/1993 | Cané et al. | |
| 5,339,948 A * | 8/1994 | Cox et al. | 198/635 |
| 5,417,030 A | 5/1995 | Ribani et al. | |
| 5,642,604 A * | 7/1997 | Muller | 53/448 |
| 5,768,996 A * | 6/1998 | Ackley | 101/483 |
| 5,836,243 A * | 11/1998 | Ackley | 101/44 |
| 5,979,309 A * | 11/1999 | Boyce | 101/35 |
| 5,988,364 A * | 11/1999 | Boyce et al. | 198/867.15 |
| 5,996,768 A | 12/1999 | Boyce et al. | 198/397.01 |
| 6,162,998 A | 12/2000 | Wurst et al. | |
| 6,390,280 B1 * | 5/2002 | Boyce | 198/540 |
| 6,539,686 B1 | 4/2003 | Trebbi | |
| 6,554,105 B2 * | 4/2003 | Brown et al. | 186/41 |
| 7,051,866 B2 * | 5/2006 | Irish | 198/681 |
| 7,082,738 B2 * | 8/2006 | Konishi et al. | 53/281 |
| 7,456,946 B2 * | 11/2008 | Ackley et al. | 356/237.1 |
| 7,789,222 B2 * | 9/2010 | Fujita et al. | 198/867.1 |
| 7,815,038 B2 * | 10/2010 | Tautz et al. | 198/799 |
| 8,191,702 B2 * | 6/2012 | Itoh et al. | 198/801 |
| 8,266,874 B2 * | 9/2012 | Runft et al. | 53/432 |
| 2005/0217207 A1 * | 10/2005 | Konishi et al. | 53/53 |
| 2006/0059867 A1 * | 3/2006 | Ansaloni | 53/454 |
| 2007/0062164 A1 * | 3/2007 | Gamberini | 53/502 |
| 2008/0141621 A1 * | 6/2008 | Funaro et al. | 53/138.1 |
| 2008/0236106 A1 * | 10/2008 | Trebbi et al. | 53/471 |

FOREIGN PATENT DOCUMENTS

| | | | |
|---|---|---|---|
| EP | 0 116 744 | 8/1984 | |
| EP | 0 135 372 | 3/1985 | |
| EP | 1 072 245 | 1/2001 | |
| FR | 2759668 | 2/1997 | B65B 9/04 |
| GB | 2341600 | 3/2000 | B65G 47/14 |
| JP | S48-1471 | 1/1973 | |
| JP | H5-170201 | 9/1993 | |

OTHER PUBLICATIONS

European Search Report of EP 12156694.7, mailed on Nov. 20, 2012, 6 pages.

* cited by examiner

Fig. 2

TRANSFER LINE

This application is a national stage application under 35 U.S.C. 371 of PCT/IB2007/003157, filed on Oct. 17, 2007, which claims the benefit of U.S. Patent Application No. 60/862,643, filed on Oct. 24, 2006.

The invention relates to a transfer line for transferring filled two-piece capsules with a controlled substantially vertical orientation from a first processing area to a second processing area.

BACKGROUND OF THE INVENTION

Capsules have been used for many years as an oral delivery form for various healthcare products, including medicines, vitamins or dietary supplements. Initially, the filling products were drugs in powdered or granular form, and the filled capsule provided a unit dose that effectively masked the bitter taste of drugs in an easy-to-swallow dosage form, being effective rapidly. Later on, taking profit from the versatility of this particular dosage form, it was proposed to enlarge the type of filling product to more complex formulations, to multiparticulates drugs and more recently to liquid products.

Capsules are generally made of two parts, i.e. a cylindrical body having a rounded bottom and a rounded cap mounted around the free end of the body. These capsules are generally made from gelatine, HPMC, pullulan or others.

The production of such capsules includes the preparation of the two parts of the capsules and the filling of such capsules. The two parts may be provided as loose parts or as empty capsules. The filling of the capsules generally occurs after some control of the empty parts (see for example U.S. Pat. No. 5,238,124 or U.S. Pat. No. 6,539,686) and/or some orientation of such parts (see for example U.S. Pat. No. 5,417,030). The filling of the capsules is made in machines which are generally called filling machines, wherein the filling product is dosed into the body and the cap is then telescopically mounted onto this body.

One problem with such two-piece capsules is that the filling product, especially when it is a fine powdered product or a low viscosity liquid product, may escape or leak from the assembled capsules, between the filling operation and the moment when the capsule is to be used; one consequence of such leaks is that the actual quantity of drug contained in the capsule when it is used is no longer the proper intended dose.

Further, it is even possible that the leaking product leads to some deterioration of the package including the capsules or of the other capsules in the package or may lead by contamination to some unwanted chemical reaction with external products. Thus, it is important in particular to prevent such leakage during transport and storage of the capsule within its package (for example a blister pack). It may thus be understood that an essential part of the general process of filling a capsule, especially when the filling product is a liquid, is the ability to then effectively strengthen the connection of the two parts. Various methods are available, including attempts to provide the body and the cap with complementary geometrical features which result in some locking thereof, or some ultrasonic welding (see for example EP-0 135 372).

However, especially for fine powdered or liquid products, the following processes are preferred: i) "sealing" using a sealing solution which provides when dried a sealing between the adjoining surfaces of the two parts and. ii) "banding" using an additional gelatine band around the circumference of the capsule at the limit of the two parts Examples of sealing solutions are given in EP-0 116 744, U.S. Pat. No. 4,584,817, U.S. Pat. No. 4,724,019, U.S. Pat. No. 4,734,149, U.S. Pat. No. 4,940,499 or DE-38 00 852. Such sealing machines generally include some conveying devices for wetting the capsules with some appropriate sealing fluid and then drying same before ejecting the sealed capsules via a discharge chute.

Later on there may exist some further processing, such as weighing (see for example U.S. Pat. No. 4,204,951) or controlling (see for example U.S. Pat. No. 6,162,998); the capsules are often eventually packed within blisters.

Filling and sealing machines are generally different machines with independent inlets and outlets, and sealing machines generally comprise inlet elements consisting of a hopper where the capsules to be sealed are entered with randomly distributed orientations. In order to ensure the precision of the seal, some sealing machines comprise, after the input hopper, orientation rectifying stations (see for example above cited U.S. Pat. No. 4,584,817 or U.S. Pat. No. 4,940,499) so as to provide the capsules to the seating/banding station in a given orientation. However, in most cases, the transfer of the filled capsules from the filling machine to the sealing machine is made without any control of the orientation of the capsule, since the filled capsules are generally discharged into containers such as baskets or onto classical conveyors where the capsules take any orientation, whereas it is easy to understand that the risk of leakage is increased when the capsules are tumbled cap downwards. It is here to be noted that a specific consequence of a leak at that moment is that the leaking product, especially the product remaining between the facing surfaces of the cap and body, may prevent a proper sealing in the following station. In addition, it is to be noted that the need to rectify the orientation of the capsules within the sealing machine leads to possible slight deformation because of the squeeze effect required therefore, increasing further the risk for leakage.

There has been proposed, in above cited U.S. Pat. No. 4,724,019, a sealing machine where no orientation rectification is required, whereas no risk of tumbling exists between the preceding filling machine and the inlet within this sealing machine. But this result is achieved by a direct connection of the inlet of the sealing machine to the outlet of the filling machine. More precisely, groups of capsules are discharged intermittently from capsule-containing compartments located in movable raceway elements of this filling machine. However, it is clear that this requires that both machines are designed so as to allow a direct connection (this requires that the machines cannot be selected and bought on the basis of their individual performances only), and enough space shall be available for locating both machines in a line.

It shall be mentioned here that, for the sake of productivity, the capsules are generally processed in groups of capsules distributed in arrays which are generally different from a machine to the other, so that there is a strong restriction in the choice of the machines to select a combination of machines allowing a direct connection.

SUMMARY OF THE INVENTION

It thus appears that there is a need for a solution for allowing the transfer of groups of filled two-piece capsules with a substantially vertical orientation (in practice with cap above the body) between a filling machine and a sealing machine without the requirement of a direct connection between these stations (so that they can be designed, selected and obtained independently) and/or of a disposition of the machines in a line. An object of the invention is to provide a transfer line which meets with this need.

Another object of the invention is to provide a transfer line for filled two-piece capsules which allows such orientation control between two successive machines independent of the function of these machines. It is clear that the ability to keep filled two-piece capsules in a substantial vertical orientation when conveying such capsules to an inspection machine, to a weighing machine or to a blistering machine, enables product integrity, avoiding fill leakage.

Another object of the invention is to allow the transfer of groups of two-piece capsules in a controlled substantial vertical orientation and in a given geometrical array at a distance from each other; this reduces the risk of capsules sticking together. More generally, this allows taking profit of the transfer line for applying some thermal processing (cooling or heating) to facilitate the next process step and to improve final product quality.

Another object of the invention if to provide a transfer line for the transfer of filled capsules between successive processing stations which requires only moderate modifications of these stations.

As a matter of fact, several known sealing machines include conveyors where the capsules, after wetting, are conveyed towards the discharge while having a given orientation; but this given orientation is horizontal, and these conveyors are intended to be wholly included within a given machine.

The invention proposes a transfer line for the transfer of identical filled two-piece capsules between two successive processing stations comprising a loading area to be located at the outlet of a first processing station for receiving in series groups of said filled two-piece capsules with a substantial vertical orientation, an unloading area to be located at the inlet of a second successive processing station for discharging in series said groups of filled two-piece capsules with a substantial vertical orientation, a plurality of identical transfer units each comprising a plurality of cavities each adapted to receive a capsule at the loading area and to let such capsule being unloaded at the unloading area, said plurality of cavities of each transfer unit being designed so as to receive in a first relative configuration the groups of filled two-piece capsules when located at a loading position within the loading area and so as to discharge these groups when located at an unloading position within the unloading area, a conveyor device adapted to temporarily and individually support the transfer units so as to transfer them from the loading position to the unloading position and vice-versa, while keeping them substantially in a same orientation in the loading and unloading positions, and at least from the loading into the unloading positions.

It may be noted that this structure provides a great versatility (the number of transfer units may be changed depending on the needs, and the conveyor can be modified, in length or direction in particular) while being compatible of high operating speeds and a continuous control of the orientation of the filled two-piece capsules. The transfer line guarantees that they remain substantially vertical and, provided that they are delivered at the loading area in vertical orientation with cap onto the body, the risks of escape of product, even when it is a low viscosity liquid, are negligible. Further, there is no need to provide in the second station any means for rectifying the orientation; this helps to simplify the structure of such second processing stations.

When property selecting the material of the transfer units (steel for example), it is possible to take profit of the transfer for applying some thermal processing, smooth heating or smooth cooling (with the provision of appropriate air blowers or any similar means along the transfer line). On the other hand it is possible to maintain the temperature of the capsules if the material does not conduct heat.

Anyway, there is no risk of contact (and any risk of sticking) between the capsules so that their integrity is guaranteed.

Preferably, said cavities in the transfer units are generally vertical bores having each an upper inlet and a lower outlet. This makes it easy to load and unload the transfer units, since it is possible to use gravity, instead of more complicated means such as suction or blowing devices, for example.

In this case, preferably, the transfer units have upper and lower parallel faces and the bores extend from such upper and lower faces while being parallel to each other. This corresponds to a geometry which makes it easy to manufacture, to handle and to store the transfer units. In particular, the transfer units may be blocks of generally parallelepiped shape.

It is preferred that the generally vertical bores are parallel to each other even when the groups of filled two-piece capsules are to be treated in the second station in a second relative configuration which is different from the relative configuration at the inlet into the transfer units. In this last case, the unloading area preferably comprises an interface unloading block comprising inlets disposed in the first configuration and outlets disposed in, the second relative configuration. Thus the transfer units all have simple geometry, whereas the difference between the first and second relative configurations has only a geometrical consequence on a single interface block, it being noted that it is possible to connect different relative configurations on top and bottom faces of a block via slightly inclined bores, so that these bores are generally vertical.

Preferably, the conveyor device comprises an indexing device at both the loading and unloading areas for moving the transfer units within these areas and maintaining these transfer units in the loading and unloading during loading and unloading respectively, and a continuous moving device for moving the transfer units between the indexing devices. This combination of step by step movements with continuous movements between the loading and unloading areas makes it possible to select any known continuous moving devices between the loading and unloading areas, depending on their respective locations (they may be not in line or at the same level) whereas the indexing devices which are generally more expensive than continuous devices may be selected without any consideration of the actual geometry of the global configuration of the stations to be connected.

As a preferred example, the continuous moving device comprises at least one conveying belt extending below the transfer units for supporting same. However, other continuous conveyor elements may be used, such as carousels which may maintain the orientation of the transfer units when they have a vertical axis as well as when their axis is horizontal (provided that the transfer units are suspended, for example).

As a preferred example, possibly in combination with the preceding feature, each indexing device comprises a buffering zone provided with a static guiding frame for gliding reception of transfer units from the continuous moving device, and at least a reciprocating element for successively moving transfer units successively into or from the loading or unloading position.

Preferably, said transfer units have lateral pins cooperating with said static guiding frame. This makes it rather easy to combine the movements provoked by the continuous moving devices and the indexing devices.

In a configuration of interest, the continuous moving device comprises an upper conveying belt for transferring loaded transfer units from the loading area to the unloading area and a lower conveying belt for transferring empty transfer units from the unloading area to the loading position, and wherein the indexing device at the loading device is adapted to move upwards empty transfer units towards the loading position and the indexing device at the unloading device is adapted to push loaded transfer units from the unloading position towards the lower conveying belt. This is quite appropriate for loading from upwards and unloading downwards.

Advantageously, the transfer units are maintained in their orientation not only from the loading position (including same) into the unloading position (including same), but also during the movement back without any capsules, allowing the transfer units to move in the same orientation in one direction and in the other direction.

The transfer line preferably comprises interface elements to be included within the stations to be connected (they may be of no use when similar elements already exist within such stations). In other words the transfer line preferably includes a first interface element to be included at the loading position within the first processing station, and a second interface element to be included at the unloading position within the second processing station. As an example of interest, the first interface element is a swinging arm adapted to seize capsules and to load same into a transfer unit which is at the loading position, and/or the second interface element is a block provided with bores adapted to receive capsules at their upper end at the unloading position and to deliver these capsules at their lower end.

In the case of this second interface element, it is of interest that the upper ends and the lower ends may define different arrays, at least some of the bores being inclined with respect to other of these bores. It means that it is possible that a group of capsules has a first configuration at the loading position which is different from the configuration of such group during processing within the second processing station, provided that a proper interface block is present; it may be noted that, when the second processing station is changed, this would require at most a change of the interface block without having, in particular, any change to the transfer units.

It is clear from the above comments that the invention has particular advantages when the two stations are filling and sealing stations: the invention also comprises not only a transfer line alone but also the combination of the transfer line with a first processing station and a second processing station wherein the first processing station is a capsule filling station and the second processing station is a capsule sealing station.

However, it has been noted herein above that the successive lines may also be implemented between stations of other types, for example between a filling station and an inspection station or a weighing station, or from one such preceding station and a blister packaging station, for example.

Figure 1:
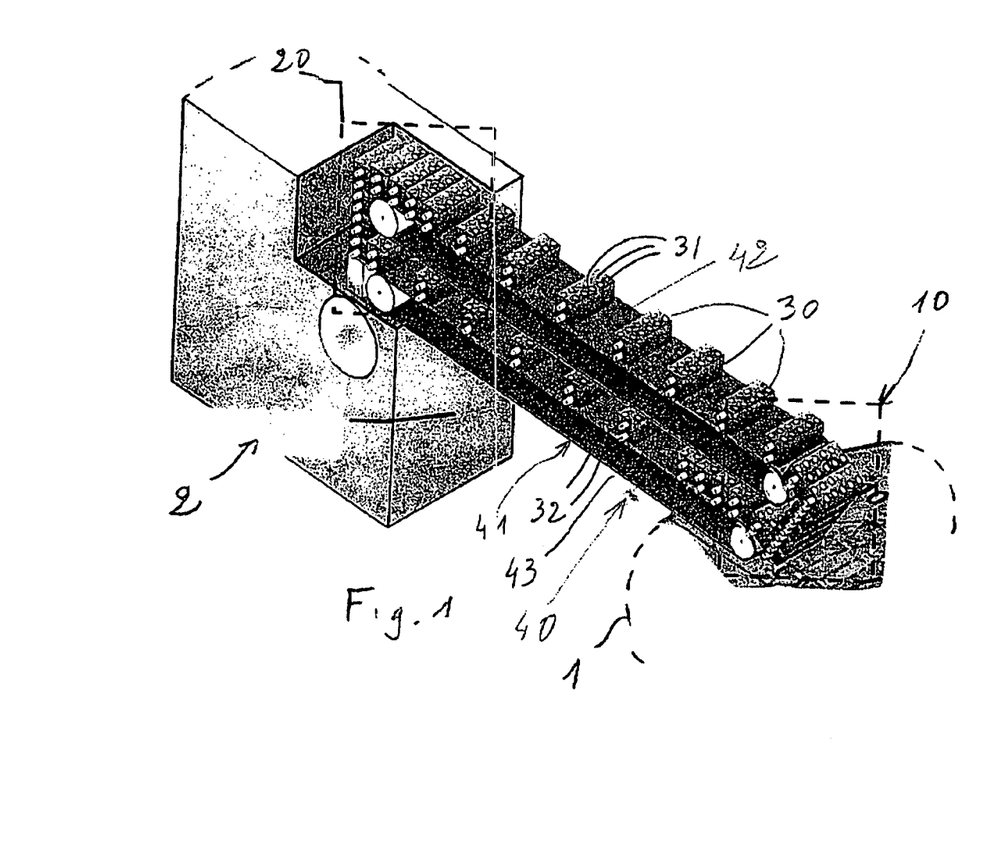
FIG. 1 is a general schematic view of a transfer line extending between two capsules processing stations.

The transfer line of FIG. 1 extends between two successive processing stations generally referred as 1 and 2.

These processing stations are intended to apply treatments to two-piece capsules for the production of medicines for example. In the described case, these stations are a filling station and a sealing station, respectively, of any known type.

The first station delivers groups of filled two-piece capsules in a first predetermined configuration or array, whereas the second station is intended to receive such groups of capsules in a second predetermined configuration which may be, or not, identical to the first configuration.

This transfer line generally comprises:
a loading area 10 to be located at the outlet of the station 1,
an unloading area 20 to be located at the inlet of station 2,
a plurality of transfer units 30 which are identical to each other,
a conveyor device 40.

The identical transfer units each comprise a plurality of cavities 31 each adapted to receive a capsule at the loading area and to let such capsule being unloaded at the unloading area. The design (or array) of the cavities of the cavities of each transfer unit is such that, when this transfer unit is located at a loading position within the loading area and so as to discharge these groups when located at an unloading position in the unloading area.

This means that the transfer unit has cavities which may receive capsules when a group of capsules is delivered by the first station and that such capsules loaded in the transfer units can be delivered at the unloading area so as to be further processed. However, it is possible that the transfer units include more cavities than it is necessary for a given filling station; this may allow using same transfer unite for different filling stations.

The cavities of the transfer units 30 may be loaded and unloaded with capsules through a variety of technical effects such as suction and blowing. Preferably, these cavities are bores which have an upper inlet 31A and a lower outlet 31B (see FIG. 2 where a transfer unit is shown with a front part cut away). More precisely, the transfer units shown on the drawings have upper and lower parallel faces and the bores extend from such upper and lower faces while being parallel to each other. This corresponds to a very simple geometry. The transfer units are here of a parallelepiped shape, more precisely of rectangular parallelepiped shape.

Figure 2:
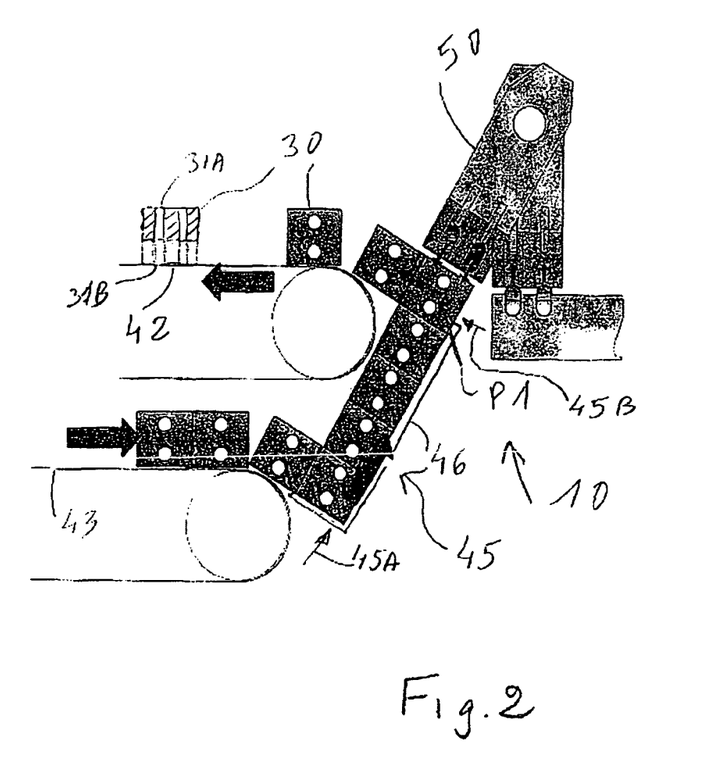
FIG. 2 is detailed schematic view of an end of such transfer line at a loading area.

It may be noted that these transfer units are provided with lateral pins 32, the interest of which will appear herein below.

The conveyor is adapted to temporarily and individually support the transfer units so as to transfer them from the loading position to the unloading position and vice-versa, while keeping them substantially in a same orientation in the loading and unloading positions and at least from this loading position to this unloading position (and preferably during the return back movement). Such conveyor advantageously comprises:
a indexing device at both the loading and unloading areas for moving the transfer units within the areas and maintaining these transfer units in the loading and unloading positions during loading and unloading respectively, and
a continuous moving device for moving the transfer units between the indexing devices. The continuous moving device, generally referred to as 41 is the central part of the transfer line of FIG. 1. It comprises here at least one conveying belt extending below the transfer units, what allows an easy individual and temporary support of the transfer units. As an alternative, this continuous device comprises a carousel.

More precisely, this central portion comprises, in the shown example, an upper conveying belt 42 for transferring loaded transfer units from the loading area to the unloading area and a lower conveying belt 43 for transferring empty transfer units from the unloading area to the unloading position.

Each indexing device comprises here a buffering zone provided with a static guiding frame for gliding reception of transfer units from the continuous moving device, and at least a reciprocating element for successively moving transfer units into or from the loading or unloading position.

At the loading area, at FIG. 2, the indexing device 45 is adapted to move upwards empty transfer units towards the loading position P1; a first reciprocating element schematically shown by arrow 45A pushes empty transfer units upwards, whereas a second reciprocating element schematically shown by arrow 45B pushes away the loaded transfer units back onto the upper conveying belt.

In this example, the static guiding frame schematically referred to as 46 comprises plates supporting the transfer units when moved towards the loading position. As an alternative, such frame consists of bars cooperating with the lateral pins of the transfer units (similar to what is disclosed in FIG. 3).

Figure 3:
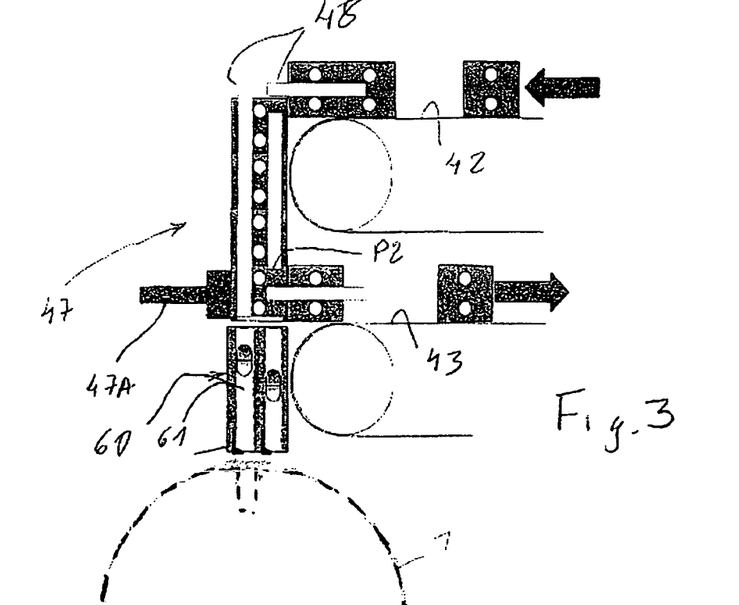
FIG. 3 is a detailed schematic view of the other end of such transfer line at the unloading area.

At the unloading area, at FIG. 3, the indexing device 47 is adapted to push loaded transfer units from the unloading position P2 towards and onto the lower conveying belt. It comprises a reciprocating device, shown as a pusher 47A.

The static guiding frame 48 comprises two lateral bars extending horizontally at the outlet of the upper belt and then vertically towards the unloading position P2.

The transfer line may comprise an interface element to be included at one of the processing station.

FIG. 2 shows a swinging arm 50 which can be a first interface element with the first station; such swinging arm 50 is known per se at the outlet of some existing capsule filling stations. Such arm 50 is adapted to seize capsules at the end of the processing in the station and then to load same into a transfer unit which is in the loading position P1. Of course, such first interface element may be not useful when the first processing station is already provided with such element. Otherwise, one skilled in the art knows how to change the station so as to include such swinging arm 50.

FIG. 3 shows a second interface element 60 which may be used if necessary. It is here a block provided with bores 61 which are parallel; these bores are adapted to receive capsules at their upper end and to deliver these capsules at their lower end.

It is within the skills of one skilled in the art to provide the transfer units or this block with gate elements at the lower ends so as to prevent escape of the loaded capsules when not appropriate.

Figure 4:
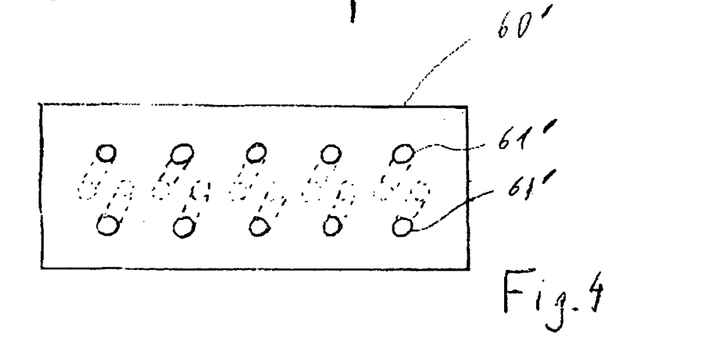
FIG. 4 is a view of a interface block at the unloading end of the transfer line.

FIG. 4 shows an alternative design for the block, noted 60', where the array of the upper ends is different from the array of the lower ends for further processing at the drum part 80. More precisely, the bores 61' are such that the upper ends are in a array of two rows of five columns whereas the lower ends are in an array of one row of ten columns; this is achieved in properly inclining the bores with respect to each other.

It may be noted that the transfer line may be provided with several interface blocks, depending on the variety of machines existing on the market; the operator needs only to change the block when changing the machine situated after the transfer line.

Further, it is to be noted that the transfer line may be used before stations other than sealing machines, for example, inspection or blistering stations. And this transfer line may be used after filling machines as well as after such inspection station (since the orientation of the capsules may remain controlled during the whole process after filling, it may even be possible, for some powdered products, to omit the sealing phase, this resulting in a simplification of the whole process).

The invention claimed is:

1. A transfer line for the transfer of identical filled two-piece capsules between two successive processing stations comprising:
    a loading area to be located at the outlet of a first processing station for receiving in series groups of said filled two-piece capsules with a substantially vertical orientation,
    an unloading area to be located at the inlet of a second successive processing station for discharging in series said groups of filled two-piece capsules with a substantially vertical orientation,
    a plurality of identical transfer units each comprising a plurality of cavities each adapted to receive one of the filled two-piece capsules at the loading area and to let such capsule be unloaded in the unloading area, said plurality of cavities of each transfer unit being designed to receive in a first relative configuration the groups of filled two-piece capsules when located at a loading position in the loading area and so as to discharge these groups when located at an unloading position in the unloading area,
    a conveyor device adapted to temporarily and individually support the transfer units so as to transfer the transfer units from the loading position to the unloading position and vice-versa, while keeping the filled two-piece capsules in the same substantially vertical orientation in the loading and unloading positions, and at least from the loading position to the unloading position.

2. The transfer line of claim 1, wherein said cavities in the transfer units are essentially vertical bores having each an upper inlet and a lower outlet.

3. The transfer line of claim 2, wherein the transfer units have upper and lower parallel faces and the bores extend from such upper and lower faces while being parallel to each other.

4. The transfer line of claim 2, wherein the generally vertical bores are parallel to each other, so that the upper inlets and the lower outlets are in the first relative configuration, and the unloading area comprises an interface unloading block comprising inlets disposed in the first configuration and outlets disposed in a second relative configuration which is different from the first relative configuration.

5. The transfer line of claim 1, wherein the conveyor device comprises a indexing device at both the loading and unloading areas for moving the transfer units within these areas and maintaining these transfer units in the loading and unloading positions during loading and unloading respectively, and a continuous moving device for moving the transfer units between the indexing devices.

6. The transfer line of claim 5, wherein the continuous moving device comprises at least one conveying belt extending below the transfer units for supporting same.

7. The transfer line of claim 5, wherein each indexing device comprises a buffering zone provided with a positioning device to transfer units from the continuous moving device, and at least a reciprocating element for successively moving transfer units successively into or from the loading or unloading position.

8. The transfer line of claim 7, wherein said transfer units have lateral pins cooperating with said static guiding frame.

9. The transfer line of claim 7, wherein the continuous moving device comprises an upper conveying belt for transferring loaded transfer units from the loading area to the unloading area and a lower conveying belt for transferring empty transfer units from the unloading area to the loading position, and wherein the indexing device at the loading device is adapted to move upwards empty transfer units towards the loading position and the indexing device at the unloading device is adapted to push loaded transfer units from the unloading position towards the lower conveying belt.

10. The transfer line of claim 1, wherein the conveyor device is adapted to move the transfer units while continuously keeping the transfer unit substantially in the same orientation.

11. The transfer line of claim 1, further comprising a first interface element to be included at the loading position within the first processing station, and a second interface element to be included at the unloading position within the second processing station.

12. The transfer line of claim 11, wherein the first interface element is a swinging arm adapted to seize capsules and to load same into a transfer unit which is at the loading position.

13. The transfer line of claim 11, wherein the second interface element is a block provided with bores adapted to receive capsules at their upper end at the unloading position and to deliver these capsules at their lower end.

14. The transfer line of claim 13, wherein the upper ends and the lower ends define different arrays, at least some of the bores being inclined with respect to other of these bores.

15. The combination of the transfer line of claim 1, with a first processing station and a second processing station wherein the first processing station is a capsule filling station and the second processing station is a capsule sealing station.

* * * * *

UNITED STATES PATENT AND TRADEMARK OFFICE
CERTIFICATE OF CORRECTION

| | |
|---|---|
| PATENT NO. | : 8,671,650 B2 |
| APPLICATION NO. | : 12/446593 |
| DATED | : March 18, 2014 |
| INVENTOR(S) | : Gunther Victor Maria Emiel Van Goolen et al. |

It is certified that error appears in the above-identified patent and that said Letters Patent is hereby corrected as shown below:

Title page, item 57, line 3, "comprising a and on unloading area" should read
--comprising a loading area and an unloading area--.

Signed and Sealed this
Eighth Day of July, 2014

Michelle K. Lee
*Deputy Director of the United States Patent and Trademark Office*